(12) United States Patent
Zhang et al.

(10) Patent No.: US 11,301,556 B2
(45) Date of Patent: Apr. 12, 2022

(54) VERIFICATION METHOD AND DEVICE (71) Applicant: ADVANCED NEW TECHNOLOGIES CO., LTD., Grand Cayman (KY)

(72) Inventors: Shijing Zhang, Hangzhou (CN); Xuan Jiang, Hangzhou (CN); Junjie Li, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 145 days.

(21) Appl. No.: 16/286,270

(22) Filed: Feb. 26, 2019

(65) Prior Publication Data

US 2019/0197232 A1 Jun. 27, 2019

Related U.S. Application Data

(63) Continuation of application No. PCT/CN2017/097951, filed on Aug. 18, 2017.

(30) Foreign Application Priority Data

Aug. 31, 2016 (CN) .......................... 201610798104.0

(51) Int. Cl.
*G06F 7/04* (2006.01)
*G06F 21/45* (2013.01)
(Continued)

(52) U.S. Cl.
CPC ............ *G06F 21/45* (2013.01); *G06F 21/316* (2013.01); *G06F 40/30* (2020.01); *H04L 29/06* (2013.01); *H04L 63/08* (2013.01)

(58) Field of Classification Search
CPC ........ G06F 21/45; G06F 21/316; G06F 40/30; H04L 63/08; H04L 29/06; H04L 63/0876; H04L 63/0884
See application file for complete search history.

(56) References Cited

U.S. PATENT DOCUMENTS 8,161,534 B2    4/2012  Golle et al.
8,555,357 B1 * 10/2013  Gauvin  ............... H04L 63/1441
                                                      726/6
(Continued)

FOREIGN PATENT DOCUMENTS

CA    2474600 C    9/2009
CN    1965350 A    5/2007
(Continued)

OTHER PUBLICATIONS

"Pictures or Questions? Examining User Responses to Association-Based Authentication" Karen Renaud (Year: 2010).*
(Continued)

*Primary Examiner* — Gary S Gracia (57) ABSTRACT

Methods, systems, and apparatus, including computer programs encoded on computer storage media, for identity verification are provided. One of the methods includes: generating a security question for verifying a target user; determining an answer for the target user to match the security question; determining a category identification of the answer for the target user; determining users' data corresponding to the category identification of the answer for the target user; searching, in the determined users' data, for one or more pieces of the users' data related to the answer for the target user to serve as one or more distraction answers; and verifying the target user according to the security question, the answer for the target user, and the one or more distraction answers.

18 Claims, 2 Drawing Sheets

(51) Int. Cl.
  *H04L 9/40* (2022.01)
  *G06F 40/30* (2020.01)
  *G06F 21/31* (2013.01)
  *H04L 29/06* (2006.01)
  *G06F 15/16* (2006.01)

(56) References Cited

U.S. PATENT DOCUMENTS

| | | | |
|---|---|---|---|
| 8,639,937 B2 | 1/2014 | Bagga et al. | |
| 8,997,240 B1 | 3/2015 | Kohen et al. | |
| 9,223,775 B2 | 12/2015 | Wang et al. | |
| 9,374,369 B2 | 6/2016 | Mahaffey et al. | |
| 9,633,322 B1* | 4/2017 | Burger | G06Q 20/405 |
| 9,817,958 B1* | 11/2017 | McCorkendale | H04L 63/08 |
| 9,836,586 B2 | 12/2017 | Scea et al. | |
| 10,187,394 B2 | 1/2019 | Bar et al. | |
| 10,318,756 B2 | 6/2019 | O'Brien | |
| 10,454,912 B2* | 10/2019 | Riddick | H04L 63/08 |
| 2002/0083347 A1 | 6/2002 | Taguchi | |
| 2004/0197759 A1 | 10/2004 | Olson | |
| 2004/0210923 A1* | 10/2004 | Hudgeons | H04H 20/38 725/24 |
| 2005/0039057 A1 | 2/2005 | Bagga et al. | |
| 2006/0129834 A1* | 6/2006 | Ellmore | G06Q 20/108 713/183 |
| 2007/0022300 A1 | 1/2007 | Eppert et al. | |
| 2007/0219794 A1 | 9/2007 | Park et al. | |
| 2008/0005037 A1* | 1/2008 | Hammad | G06Q 20/382 705/67 |
| 2008/0208580 A1 | 8/2008 | Scholl | |
| 2008/0319896 A1* | 12/2008 | Carlson | G06Q 20/10 705/38 |
| 2009/0006544 A1* | 1/2009 | Liu | H04L 63/105 709/203 |
| 2009/0241201 A1* | 9/2009 | Wootton | G06F 21/31 726/28 |
| 2010/0199338 A1 | 8/2010 | Craddock et al. | |
| 2012/0191621 A1* | 7/2012 | Williams | H04L 63/18 705/325 |
| 2013/0144786 A1 | 6/2013 | Tong et al. | |
| 2014/0033327 A1* | 1/2014 | Conte | G06F 21/6245 726/28 |
| 2014/0178850 A1* | 6/2014 | Galen | G09B 5/00 434/362 |
| 2014/0259130 A1* | 9/2014 | Li | H04L 63/0281 726/6 |
| 2014/0282870 A1 | 9/2014 | Markwordt et al. | |
| 2015/0066919 A1* | 3/2015 | Park | G06F 16/438 707/724 |
| 2015/0142643 A1* | 5/2015 | Ceribelli | G06Q 30/04 705/39 |
| 2015/0186632 A1 | 7/2015 | Liu et al. | |
| 2015/0264023 A1* | 9/2015 | Reno | H04L 63/08 726/7 |
| 2016/0085962 A1* | 3/2016 | Sokolov | G06F 21/31 726/6 |
| 2016/0253596 A1* | 9/2016 | Goth, III | G06F 16/24578 706/12 |
| 2016/0328794 A1* | 11/2016 | Schrump | H04L 63/08 |
| 2017/0078262 A1* | 3/2017 | Riddick | G06F 21/31 |
| 2017/0299399 A1 | 10/2017 | Yamaguchi et al. | |

FOREIGN PATENT DOCUMENTS

| | | |
|---|---|---|
| CN | 104052731 A | 9/2014 |
| CN | 104348822 A | 2/2015 |
| CN | 105099675 A | 11/2015 |
| CN | 105610865 A | 5/2016 |
| JP | 2002-197062 A | 7/2002 |
| JP | 2007-305089 A | 11/2007 |
| JP | 2011-227573 A | 11/2011 |
| JP | 2011-238111 A | 11/2011 |
| JP | 2012-068779 A | 4/2012 |
| JP | 2014-535103 A | 12/2014 |
| JP | 2016-81129 A | 5/2016 |
| TW | 200539648 A | 12/2005 |
| WO | 2007009209 A1 | 1/2007 |
| WO | 2013082190 A1 | 6/2013 |
| WO | 2015200188 A1 | 12/2015 |
| WO | 2016106973 A1 | 7/2016 |
| WO | 2016122441 A1 | 8/2016 |

OTHER PUBLICATIONS

First Office Action and First Search for Chinese Application No. 201610798104.0 dated Apr. 23, 2019 with English machine translation (9 pages).
Written Opinion of the International Searching Authority and International Search Report for PCT Application No. PCT/CN2017/097951 dated Oct. 31, 2017 (14 pages).
International Preliminary Report on Patentability Chapter I for PCT Application No. PCT/CN2017/097951 dated Mar. 14, 2019 (12 pages).
Non-final rejection and Search Report for Taiwanese Application No. 106120399 dated Feb. 20, 2019 (8 pages).
Office Action for Japanese Application No. 2019-511751 dated Apr. 7, 2020.
Search Report for European Application No. 17845244.7 dated Mar. 11, 2020.
Second Office Action for Chinese Application No. 201610798104.0, dated Jan. 15, 2020, 10 pages.
Office Action for Korean Application No. 10-2019-7009105 dated Jun. 19, 2020.
First Examination Report for Indian Application No. 201947009277 dated Oct. 5, 2020.
Decision of Final Rejection for Japanese Application No. 2019-511751 dated Mar. 23, 2021.

* cited by examiner

VERIFICATION METHOD AND DEVICE

CROSS-REFERENCE TO RELATED APPLICATIONS

The present application is a continuation application of International Patent Application No. PCT/CN2017/097951, filed on Aug. 18, 2017, which is based on and claims priority to the Chinese Patent Application No. 201610798104.0, filed on Aug. 31, 2016 and entitled "Verification Method and Device." The above-referenced applications are incorporated herein by reference in their entirety.

TECHNICAL FIELD

The application relates to the field of computer technologies, and in particular, to a verification method and device.

BACKGROUND

With the development of information technologies, networks have become an important channel for users to acquire services. A user can acquire corresponding online businesses by using the user's personal information in a corresponding online system (e.g., a website). To ensure the security of the process in which the user acquires online businesses, user identity authentication has become an important step in the business process (wherein the identity authentication is a process of verifying a user's personal identity).

In current technologies, security question verification, as a common manner of identity authentication, has been used extensively. In scenarios of password recovery, user identity authentication is performed mostly in the manner of security question verification. For example, an online system automatically generates a corresponding security question, generates a correct answer that matches the security question according to user information, and meanwhile, randomly generates a number of incorrect answers. When security question verification is to be performed on a user, the online system displays the generated security question and a number of answer choices to the user, so as to complete the identity authentication of the user.

In the process of automatically generating answer choices by the online system, however, the difference between the correct answer and incorrect answers is relatively big, as the incorrect answers are generated in a random manner. As a result, an illegitimate user can easily select the correct answer and "pretend to be" the user to pass the security question verification.

SUMMARY

Embodiments of the specification provide an information verification method and a verification device to solve the problem of current technologies that the difference between the correct answer and incorrect answers of a security question is relatively big.

According to one aspect, the verification method provided in the embodiments of the specification comprises:
generating a security question for verifying a target user;
determining an answer for the target user to match the security question;
determining a category identification of the answer for the target user;
determining users' data corresponding to the category identification of the answer for the target user;
searching, in the determined users' data, for one or more pieces of the users' data related to the answer for the target user to serve as one or more distraction answers; and
verifying the target user according to the security question, the answer for the target user, and the one or more distraction answers.

In some embodiments, the method further comprises the following steps for obtaining the users' data: acquiring data from a plurality of users, the acquired data forming the users' data; determining a category identification of each piece of the users' data; categorizing the users' data into categories according to the category identification of each piece of the users' data, each category corresponding to a category identification; and generating one or more answer libraries each corresponding to a category identification for each category of the users' data.

In other embodiments, the users' data comprises: at least one of operation data generated based on operations of the users and the users' personal data. In some embodiments, each category identification comprises: at least one personal data attribute identification and/or at least one operation data attribute identification.

In still other embodiments, determining users' data corresponding to the category identification of the answer for the target user and searching, in the determined users' data, for one or more pieces of the users' data related to the answer for the target user to serve as one or more distraction answers comprise: when the category identification of the answer for the target user includes an operation data attribute identification, determining an answer library corresponding to the operation data attribute identification, searching in the determined answer library for users' data corresponding to a personal data attribute identification of the target user, and searching, in the users' data corresponding to the personal data attribute identification of the target user, for the one or more pieces of the users' data related to the answer for the target user according to semantics and/or characters of the answer for the target user to serve as the one or more distraction answers.

In yet other embodiments, searching for the one or more pieces of the users' data related to the answer for the target user according to semantics and/or characters of the answer for the target user comprises: determining, according to the semantics and/or characters of the answer for the target user, a similarity between the answer for the target user and each piece of the users' data corresponding to the personal data attribute identification of the target user; and searching for the one or more pieces of the users' data related to the answer for the target user according to the similarity.

In other embodiments, searching for the one or more pieces of the users' data related to the answer for the target user according to semantics and/or characters of the answer for the target user comprises: if the number of the pieces of the users' data found according to the similarity is greater than a threshold, selecting, according to the similarity in a descending order, a number of pieces of the users' data as the distraction answers from the pieces of the users' data.

In still other embodiments, determining users' data corresponding to the category identification of the answer for the target user and searching, in the determined users' data, for one or more pieces of the users' data related to the answer for the target user to serve as one or more distraction answers comprises: when the category identification of the answer for the target user includes a personal data attribute identification, determining an answer library corresponding to the personal data attribute identification, and searching in the determined answer library for the one or more pieces of the users' data related to the answer for the target user according to semantics and/or characters of the answer for the target user to serve as the one or more distraction answers.

In yet other embodiments, acquiring data from a plurality of users comprises: when the data from the plurality of users changes, acquiring changed data; and the method further comprises: updating the answer libraries with the changed data.

In other embodiments, acquiring data from a plurality of users comprises: acquiring data from the plurality of users according to a set period; and the method further comprises: updating the answer libraries with the data acquired from the plurality of users according to the set period.

According to another aspect, a verification device is provided by the specification. According to some embodiments, the verification device comprises: one or more processors and one or more non-transitory computer-readable memories coupled to the one or more processors and configured with instructions executable by the one or more processors to cause the device to perform operations comprising: generating a security question for verifying a target user; determining an answer for the target user to match the security question; determining a category identification of the answer for the target user; determining users' data corresponding to the category identification of the answer for the target user; searching, in the determined users' data, for one or more pieces of the users' data related to the answer for the target user to serve as one or more distraction answers; and verifying the target user according to the security question, the answer for the target user, and the one or more distraction answers.

According to still another aspect, A non-transitory computer-readable storage medium is provided by the specification. According to some embodiments, the storage medium stores instructions executable by one or more processors to cause the one or more processors to perform operations comprising: generating a security question for verifying a target user; determining an answer for the target user to match the security question; determining a category identification of the answer for the target user; determining users' data corresponding to the category identification of the answer for the target user; searching, in the determined users' data, for one or more pieces of the users' data related to the answer for the target user to serve as one or more distraction answers; and verifying the target user according to the security question, the answer for the target user, and the one or more distraction answers.

At least one of the above technical solutions employed by the embodiments of the specification can achieve the following advantageous effects:

In a process that a server of a business provider performs identity authentication of a target user by using a security question, the server generates a security question for verifying a target user, determines an answer for the target user to match the security question (i.e., the correct answer), determines a category identification of the answer for the target user, and determines users' data corresponding to the category identification of the answer for the target user. All determined users' data have the same category identification as that of the answer for the target user. In other words, the determined users' data and the data of the answer for the target user belong to the same category of data. Then, one or more pieces of the users' data related to the answer for the target user can be searched for in the determined users' data to serve as one or more distraction answers. Apparently, the distraction answers and the answer for the target user have the same category identification, so that the difference between the distraction answers and the answer for the target user is relatively small, which ensures that the distraction answers are similar to the answer for the target user. Consequently, the server can verify identity of the target user according to the security question and answer choices comprising the answer for the target user and the distraction answers. Different from the manners in current technologies, the distraction answers are not randomly generated, but have the same category identification as that of the answer for the target user. In other words, the answer for the target user and the distraction answers are in the same category, which effectively increases the distraction effect of the distraction answers, then lowers the possibility of the answer for the target user being accurately guessed by an illegitimate user, and improves the security of security question verification.

BRIEF DESCRIPTION OF THE DRAWINGS

The accompanying drawings herein are used to provide a further understanding of the specification and constitute a part of the application. The illustrative embodiments and description of the specification are used to describe the application, and do not constitute inappropriate limitation to the application. In the accompanying drawings.

DETAILED DESCRIPTION

To make the objectives, technical solutions, and advantages of the specification clearer, the technical solutions of the specification will be clearly and completely described below with reference to the embodiments and accompanying drawings of the specification. Apparently, the described embodiments are merely some, not all, embodiments of the specification. All other embodiments obtainable by a person skilled in the art without creative effort and on the basis of the embodiments of the specification shall fall within the scope of the application.

As described above, when it is necessary to perform identity authentication of a user, an online system automatically generates a corresponding security question and a number of answer choices corresponding to the security question, so that the user selects from the answer choices of the security question to complete the identity authentication. Since the difference between the correct answer and incorrect answers among a number of answer choices generated by the online system is relatively big, however, the distraction effect of the incorrect answers is relatively weak. As a result, it would be easy for an illegitimate user to select the correct answer through guessing, inference, or the like.

Therefore, an identity authentication-based information processing method is provided in the embodiments of the specification, so that a server can generate distraction answers that are similar to the correct answer, making it difficult for an illegitimate user to find out the correct answer.

The verification process in the embodiments of the specification can be implemented by a server at the back end of an online business provider, wherein the online business provider includes, but is not limited to, business providers capable of providing online businesses, such as websites, telecom operators, data centers, and the like. The server configured to implement the verification process may be, for example, a server responsible for security maintenance functions, such as a security center server at the back end of an online business provider, which is not a limitation to the specification. In the following description, servers at the back end of online business providers are all referred to as server.

The technical solutions of the embodiments of the specification will be described in detail below with reference to the accompanying drawings.

Figure 1:
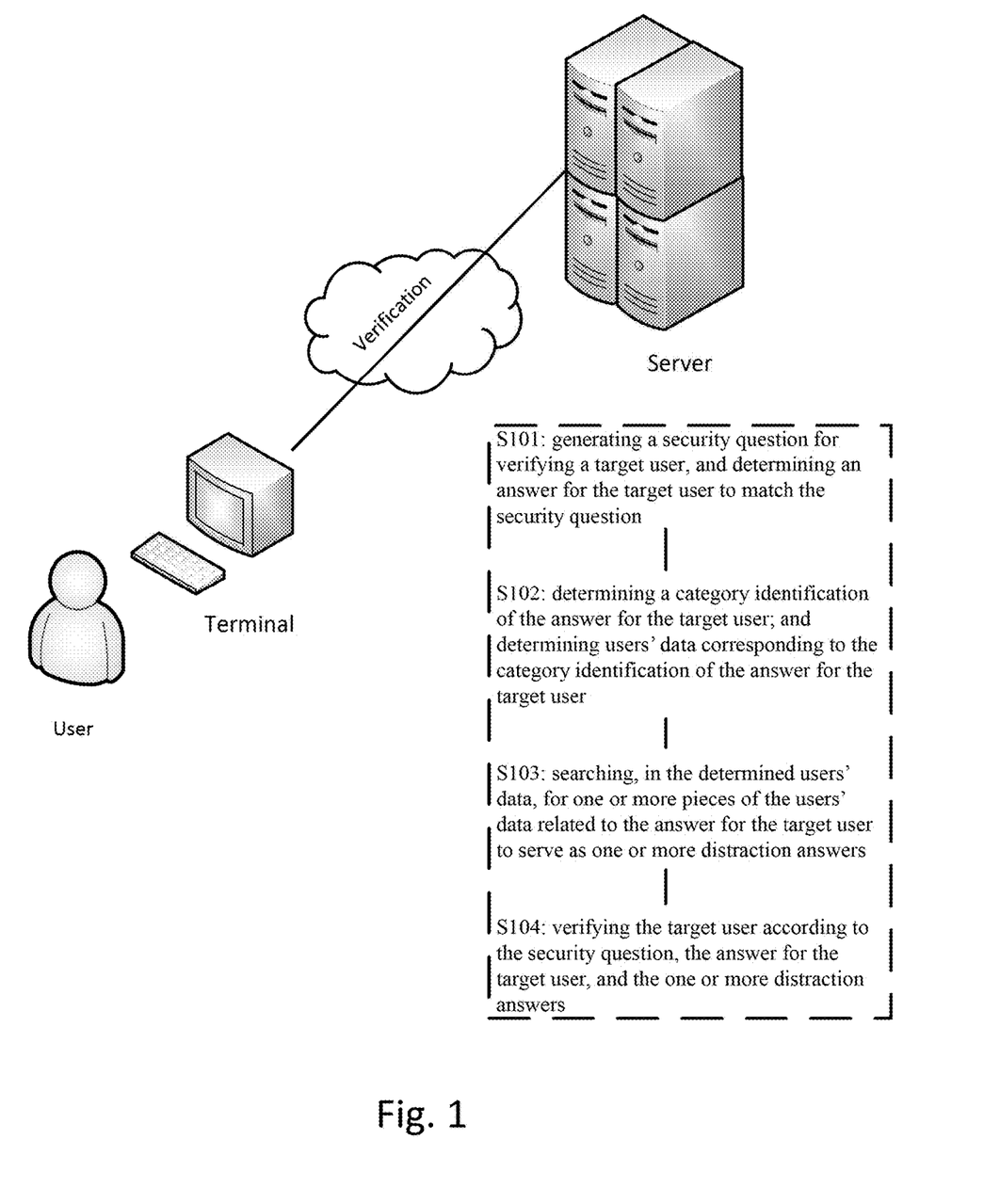
FIG. 1 is a schematic diagram of a verification process according to some embodiments of the specification.

As shown in FIG. 1, a verification process implemented in the specification is illustrated. The process comprises, for example, the following steps:

S101: generating a security question for verifying a target user, and determining an answer for the target user to match the security question.

In the embodiments of the specification, the security question is typically generated after verification is triggered. In some embodiments, it can be triggered by a user (also referred to as a target user hereinafter) or can be triggered by a server at its discretion according to the needs of the embodiments.

For example, a user can proactively send a verification request. At this point, the verification request is used to trigger a security question based verification process. As one manner in the scenario, the security question based verification process can be applied in a scenario of password recovery. In other words, when the user clicks the choice "password recovery" on a corresponding interface (e.g., an account login interface of a website), it is necessary to verify the identity of the user. Therefore, the clicking of the choice by the user can be deemed as sending a verification request. Furthermore, referring to FIG. 1, the verification request is sent to a server by the user using a terminal, and then the server receives the verification request sent by the user.

In another example, the server can perform identity verification of a user at its discretion according to a corresponding verification rule. For example, according to a set period, the server proactively generates a security question; alternatively, the server proactively generates a security question and initiates verification of the user when determining that some operations of the user have risks. These examples do not constitute limitations to the invention.

In the embodiments of the specification, the security question can come from a preset question library. In other words, different questions can be set in advance for different scenarios and business application circumstances (the process can also be set by a corresponding business program, which does not constitute a limitation to the specification) and saved into a corresponding question library. After verification is triggered, therefore, the server generates a security question for the user based on the question library.

In the above embodiments of the specification, the user (or an illegitimate user) cannot predict the security question. Therefore, the server will determine an answer for the user. The answer for the user is the correct answer with respect to the user. In some embodiments, the answer for the user is determined according to the user's data, which, for example, includes previous answers of the user. For example, if the security question generated for the user is "what nickname did you use?", then a nickname used by the user can be selected from the user's own account data as the answer for the user to match the security question.

In some embodiments, the answer for the user can be determined based on an answer library. For example, an answer library corresponding to the generated security question is determined according to a pre-established corresponding relationship between security questions and answer libraries, and the answer for the user matching the security question is generated according to the user's data in the answer library. The user's data stored in the answer library should be understood as data of the user.

Multiple pieces of data of the user may be stored in the same answer library. In the process of generating the answer for the user according to the user's data in the answer library, therefore, one piece of user's data can be selected, according to the use time and use frequency of the user's data, to generate the answer for the user. For example, when the answer library comprises multiple pieces of user's data of the same user, the use time is determined for the multiple pieces of user's data, respectively, and the piece of user's data having the use time closest to the current time is selected from the multiple pieces of user's data; alternatively, the times of use is determined for the multiple pieces of user's data, respectively, and the piece of user's data having the most times of use is selected. These examples do not constitute limitations to the invention.

In the embodiments of the specification, the user's data can be operation data generated according to operations of the user, such as products purchased by the user and an amount of transfer, or other data related to operations; or can be personal data of the user, such as the user's account name, the user's name, date of birth, and the like. These examples do not constitute limitations to the invention.

S102: determining a category identification of the answer for the target user, and determining users' data corresponding to category identification of the answer for the target user.

In some embodiments, the answer for the target user is determined according to the target user's data. The category identification of the answer for the target user is the category identification of the target user's data. For example, the server can generate category identification of user's data for each user in advance and categorize the user's data based on the category identification. According to category identification of the answer for the target user, the server can determine users' data having the same category identification. The users' data may include data of multiple users including the target user.

In some embodiments, the category identification comprises: at least one personal attribute identification and/or at least one operation data attribute identification. For example, the personal attribute identification can comprise gender identification (e.g., "male" and "female"), age identification (e.g., a certain age or a divided age range), account identification, etc., and the operation data attribute identification can comprise operation type identification (e.g., "transfer" and "payment"), product category identification, etc.

Determining corresponding users' data according to category identification of the answer for the target user in this step is for the purpose of determining one or more distraction answers from the users' data, i.e., to carry out the following step S103.

S103: searching, in the determined users' data, for one or more pieces of the users' data related to the answer for the target user to serve as one or more distraction answers.

In some embodiments, multiple answer choices are provided for a security question, and answers other than the answer for the target user (i.e., incorrect answers) in the multiple answer choices can have a distraction effect. In the embodiments of the specification, therefore, the answers other than the answer for the target user are also referred to as distraction answers.

In existing technologies, the difference between multiple answer choices of a security question is so big that an illegitimate user can easily guess the correct answer choice to pose as the user. In the embodiments of the specification, all distraction answers are related to the answer for the target user. For example, the distraction answers are similar to the answer for the target user in character length, answer format, and answer content, thereby having a distraction effect.

For example, a nickname used by a target user is "xiaoming123," then the answer for the target user matching the security question, "what was the nickname you used before?", can be "xiaoming123," while distraction answers can be "xiaoming-aaa," "xiao-ming," and the like. For example, the answers "xiaoming-aaa" and "xiao-ming" are nicknames of other users.

It can be seen from this example that the distraction answers are very similar to the answer for the target user, which increases the difficulty of recognition by an illegitimate user and further lowers the probability that the answer for the target user is guessed correctly.

In other words, the distraction answers are essentially users' data as well. Moreover, the users' data serving as distraction answers has the same category identification as that of the answer for the target user. In the example above, the category identification is user's nickname for both the answer for the target user and the distraction answers.

S104: verifying the target user according to the security question, the answer for the target user, and the one or more distraction answers.

After generating the security question and corresponding answer choices, the server can perform identity authentication of the user who sends the verification request. In one manner, the server can send the security question and its answer choices to a terminal used by the user, so that the user can view the security question and the answer choices on a corresponding page, and select one of the answer choices to complete the identity authentication.

Through the steps above, in a process that a server of a business provider performs security question based identity authentication of a target user, the server generates a security question for verifying the target user, determines an answer for the target user to match the security question (i.e., the correct answer), determines a category identification of the answer for the target user, and determines users' data corresponding to the category identification of the answer for the target user. All determined users' data have the same category identification as that of the answer for the target user. In other words, the determined users' data and the data of the answer for the target user belong to the same category of data. Then, one or more pieces of the users' data related to the answer for the target user can be searched for in the determined users' data to serve as one or more distraction answers. Apparently, the distraction answers and the answer for the target user have the same category identification, so that the difference between the distraction answers and the answer for the target user is relatively small, which ensures that the distraction answers are similar to the answer for the target user. Consequently, the server can verify identity of the target user according to the security question and answer choices comprising the answer for the target user and the distraction answers. Different from the manners in current technologies, the distraction answers are not randomly generated, but have the same category identification as that of the answer for the target user. In other words, the answer for the target user and the distraction answers are in the same category, which effectively increases the distraction effect of the distraction answers, then lowers the possibility of the answer for the target user being accurately guessed by an illegitimate user, and improves the security of security question verification.

As described above, the answer for the user and distraction answers are both a type of users' data. To find distraction answers related to the answer for the user, category identification of all users' data may be determined. For example, prior to generating a security question for verifying a target user and determining an answer for the target user to match the security question, the method above can further comprise the following steps:

Step I: acquiring data from a plurality of users, the acquired data forming the users' data;

Step II: determining a category identification of each piece of the users' data;

Step III: categorizing the users' data into categories according to the category identification of each piece of the users' data, each category corresponding to a category identification; and generating one or more answer libraries each corresponding to a category identification for each category of the users' data.

In some embodiments, the acquisition of users' data of users can be implemented by a corresponding data acquiring function in the server. Determining category identification of all the acquired users' data can include that the server assigns users' data corresponding category identification based on metadata of users' data (or attribute information of users' data).

Users' data can be categorized according to category identification of the users' data. For example, account name data are categorized into one category, product data are categorized into one category, etc. Furthermore, corresponding answer libraries can be created for the categorized users' data. The category identification based on which the users' data is categorized is essentially common category identification of this category of users' data, such as the account name data, namely, users' data of this category all belong to account name. Therefore, the category identification of "account name" is the common category identification of this category of users' data; similarly, the category identification of "product" is the common category identification of product data.

It is still possible for the users' data categorized based on the common category identification to have other category identification. For example, according to the common category identification of "product," all product data can be categorized into one category, but each piece of product data further has its respective sub-category identification, such as clothing, daily products, digital products and the like. In some embodiments, users' data can be categorized into many different categories according to various category identifications, and then corresponding various answer libraries are created. Alternatively, the users' data of users are divided into a number of categories only according to a number of set category identifications, and a corresponding number of answer libraries are created. Which manner to use can be selected according to actual needs, which does not constitute a limitation to the invention.

Therefore, a corresponding relationship with security questions can be established based on common category identification of an answer library in each category. For example, when the security question is "what nickname did you use?", a corresponding relationship can be established between the security question and an answer library with the category identification of "nickname."

As a possible manner, a security question can be generated in real time based on category identification. For example, a security question, "what nickname did you use?", is generated based on the category identification of "nickname." In another manner, a plurality of security questions can be generated based on category identification and stored in a question library. These do not constitute a limitation to the invention.

In addition, users' data is continuously generated with users conducting corresponding operations or addition of new users. In some embodiments, the server dynamically acquires newly generated users' data to keep all answer libraries updated with the newly generated users' data. For example, the server acquires changed users' data when the data from the users changes; alternatively, the server acquires users' data from the users according to a set period. Therefore, the method further comprises: updating an answer library with the acquired users' data.

On the basis of the above description, the server can generate, at its discretion, a corresponding security question and multiple answer choices in the verification process. In this process, moreover, there is no need for a user to edit corresponding answer choices in advance. Among the multiple answer choices, the similarity (i.e., relation) between the answer for the user and other distraction answers will impact the possibility of an illegitimate user accurately guessing the answer for the user (the more similar the distraction answers are to the answer for the user, the less likely an illegitimate user accurately guesses the answer for the user).

To ensure that distraction answers are related to the user answer, the distraction answers come from an answer library corresponding to the security question. For example, if a security question is "what nickname did you use?", all users' data stored in the answer library corresponding to the security question are related to nickname data (which may be nicknames used by other users or may be nickname data that is generated in advance). As a result, it can be ensured that all distraction answers generated based on the answer library are nicknames. Provided that an answer for the user is determined from the answer library, the server can search in the corresponding answer library and select distraction answers.

The process that the server searches for and selects a distraction answer will be analyzed and described in detail below:

In the embodiments of the specification, there are mainly two manners in which the server searches for and selects a distraction answer.

According to the first manner, an answer choice (either the answer for the user or a distraction answer) of a security question can be regarded as a character string. The character string may consist of texts, numbers, and symbols. For a distraction answer to have a strong distraction effect, the distraction answer may be similar to the answer for the user in expression and/or meaning of characters. In other words, the distraction answer is similar to the answer for the user semantically and/or in character expression.

For example, if an answer for the user matching a security question is "red down coat," a corresponding distraction answer can be "green down coat," "yellow down coat," or the like for a high similarity in semantics and character expression. In terms of meaning, both the distraction answer and the answer for the user semantically mean down coat in the example. In terms of character expression, both the distraction answer and the answer for the user have the same number of words and are expressed in a format of "color" +"article." Therefore, the similarity between the answer for the user and the distraction answer is high.

In this manner, therefore, the process that the server searches for a distraction answer related to the answer for the target user in the answer library can, for example, comprise: determining semantics and/or characters of the answer for the target user, determining, according to the semantics and/or characters of the answer for the target user, a similarity between each piece of users' data in the answer library and the answer for the target user, and searching for a distraction answer related to the answer for the target user in the answer library according to the determined similarity.

In this process, a semantics recognition algorithm can be used for determining semantics of the answer for the user; in addition, a similarity algorithm, such as Euclidean distance similarity and cosine similarity, etc., can be used for determining the similarity.

According to the second manner, in some embodiments, security questions can typically be divided into two types: one type of security questions are associated with use of services by users, such as "products you bought this week," "the clothing brand having the highest number of purchases by you," and the like. These two security questions are closely associated with purchase operations of a user. The other type of security questions are associated with personal information of a user, such as "account name you used," "nickname you used," and the like. These two security questions are associated with a user's account information (the account information belongs to personal information of a user). In the embodiments of the specification, different manners are used to determine corresponding distraction answers for the above two types of security questions.

The first type of security questions will be described below.

This type of security questions are typically associated with services, and corresponding answer choices are typically operation data corresponding to the services. For example, the security question of "products you bought this week" is associated with purchases. Then, answer choices corresponding to the security question can be names of products (names of products are a type of operation data), such as "Brand XX cleansing cream," "Brand YY shampoo," and the like.

To ensure a relation between a distraction answer and the answer for the user to this type of security questions, the distraction answer may have an operation attribute identification similar to that of the answer for the user. In some embodiments, the operation attribute identification is reflected as a category identification of an operation (e.g., a product category identification). In other words, in this manner, the distraction answer and the answer for the user can have the same operation category identification. Operation category identifications are categorized by an online business provider in advance. Therefore, the relation between the answer for the user and the distraction answer can be ensured. For example, if the security question is "products you bought," and if a target user purchased a cleansing cream, then the server determines the cleansing cream to be the answer for the target user (i.e., the correct answer). Assuming that the product category identification of the cleansing cream is, for example, "facial care," the server will further search, in the answer library with the category identification of "product," for pieces of users' data having the product category identification of "facial care" product as distraction answers. The obtained security question and answer choices may be as follows:

Products you bought:
A. Facial moisturizer
B. Cleansing cream
C. Liquid foundation
D. Facial mask In this example, Choice B is the correct answer (i.e., the answer for the target user), while other choices are distraction answers. The distraction answers and the answer for the target user all have the product category identification of "facial care," so that the distraction answers are related to the answer for the target user.

In some circumstances, however, it is still possible for an illegitimate user to accurately guess the correct answer in the above answer choices. For example, if the target user is a male and the target user's gender information is acquired by the illegitimate user, then the illegitimate user can infer, according to the gender information, that Choice B is the correct answer, because the products corresponding to choices A, C, and D more likely tend to be facial care products for females.

On the basis of the example above, therefore, corresponding personal data attribute identifications will be considered in the process of selecting a distraction answer from an answer library, so as to further strengthen the relation between the distraction answer and the user answer.

In some embodiments, personal data attribute identifications can comprise: a user's natural attributes and the user's business attributes. For example, the user's natural attributes can be attributes such as name, gender, age, and the like. The user's business attributes can be the user's IP address, the user's location, products preferred by the user, the user's consumption level, and the like.

Data in the answer library can be further categorized according to personal data attribute identifications. For example, cleansing creams can be divided into cleansing creams for males and cleansing creams for females according to users' gender. Therefore, data in an answer library can be categorized into a plurality of categories according to personal data attribute identifications.

In the example above, if categorization according to personal data attributes is added for the product data in the answer library and if the target user is a male, then the product data selected by the server when selecting a distraction answer will simultaneously have two category identifications, "facial care" and "male." Therefore, the obtained security question and answer choices may be as follows:
Products you bought:
A. Cleansing cream
B. Shave foam
C. Cleansing clay
D. Razor In this example, choice A is the answer for the target user, while other choices are distraction answers. As a result, the relation between the answer choices in this example is stronger. Compared to the preceding example, all products in the four choices in this example have the category identification of "male," and thus it will be more difficult for an illegitimate user to accurately guess the correct answer even if the illegitimate user learns about the target user's gender. In other words, by combining personal data attribute identifications, the possibility that an illegitimate user accurately guesses the correct answer can be further lowered.

The second type of security questions is described below.

This type of security questions are typically associated with personal information of a user. Correspondingly, answer choices for this type of security questions come from the user's personal data, such as the user's account name, nickname, date of birth, age range, address, etc. Character expressions are more emphasized for answer choices of this type of security questions. In the process of selecting a distraction answer in a corresponding answer library, therefore, the server selects a distraction answer having a similar character expression to the character expression of the answer for the user.

For example, data in an answer library can be categorized according to character type, structure, length and the like. After the answer for the user (i.e., the correct answer) is determined, a corresponding distraction answer is further selected.

For example, if the security question is "account name you used," the server determines that the account name used by the user is "xiaoming123," namely, the account name is the answer for the user matching the security question. The account name comprises English letters and numbers. Therefore, the server searches for account names in the category of "English letters+numbers" in the answer library having the category identification of "account;" in addition, the server further searches, in the account names of the category, for account names having a matching character length, and finds the English letters of "xiaoming" according to the sequence of English letters.

This way, similarity between a distraction answer and the user answer can be enhanced, which can further strengthen the distraction effect of the distraction answer. for example, the generated security question and answer choices can be:
Account name you used:
A. xiaoming789
B. xiaoming333
C. xiaoming123
D. xiaoming666

In this example, choice C is the answer for the user (i.e., the correct answer), while other choices are distraction answers. It can be seen from the example that the similarity among the answer choices of the security question is high (i.e., the character expressions are similar), so that it is difficult for an illegitimate user to accurately guess the correct answer.

In some embodiments, the searching for users' data related to the answer for the target user according to the category identification in Step S104 comprises: when the category identification of the answer for the target user includes an operation data attribute identification, determining an answer library corresponding to the operation data attribute identification, searching in the determined answer library for users' data corresponding to a personal data attribute identification of the target user, and searching, in the users' data corresponding to the personal data attribute identification of the target user, for the one or more pieces of the users' data related to the answer for the target user according to semantics and/or characters of the answer for the target user to serve as the one or more distraction answers; or when the category identification of the answer for the target user is a personal data attribute identification, determining an answer library corresponding to the personal data attribute identification, and searching in the determined answer library for the one or more pieces of the users' data related to the answer for the target user according to semantics and/or characters of the answer for the target user to serve as the one or more distraction answers.

The users' data related to the answer for the target user can be used as distraction answers. In some embodiments, the searching for users' data related to the answer for the target user is based on the similarity between the user data and the user answer in terms of semantics and/or characters. For example, searching for the one or more pieces of the users' data related to the answer for the target user according to semantics and/or characters of the answer for the target user comprises: determining, according to the semantics and/or characters of the answer for the target user, a similarity between the answer for the target user and each piece of the users' data corresponding to the personal data attribute identification of the target user; and searching for the one or more pieces of the users' data related to the answer for the target user according to the similarity.

In the embodiments of the specification, after generating the security question for the user subject to identity authentication, the server determines the answer for the user, on the basis of which the server determines a distraction answer similar to the answer for the user in a corresponding answer library. As the distraction answer is similar to the answer for the user in data attributes, semantics and/or characters, the distraction answer can have a strong confusing effect, so that it is difficult for an illegitimate user to accurately guess the correct answer from the answer choices.

In addition, there may be a limit to the number of answer choices ultimately displayed to the target user (i.e., a set number), such as 3 to 6 choices, while the server may find a plurality of distraction answers from an answer library and the number is greater than the set number of answer choices. In this case, the server will further select the set number of distraction answers from the found plurality of distraction answers according to the similarity with the answer for the target user.

In other words, in some embodiments, searching for the one or more pieces of the users' data related to the answer for the target user according to semantics and/or characters of the answer for the target user comprises: if the number of the pieces of the users' data found according to the similarity is greater than a threshold, selecting, according to the similarity in a descending order, a number of pieces of the users' data as the distraction answers from the pieces of the users' data.

The verification method according to some embodiments of the specification is described above. On the basis of the same concept, a verification device is further provided according to some embodiments of the specification.

Figure 2:
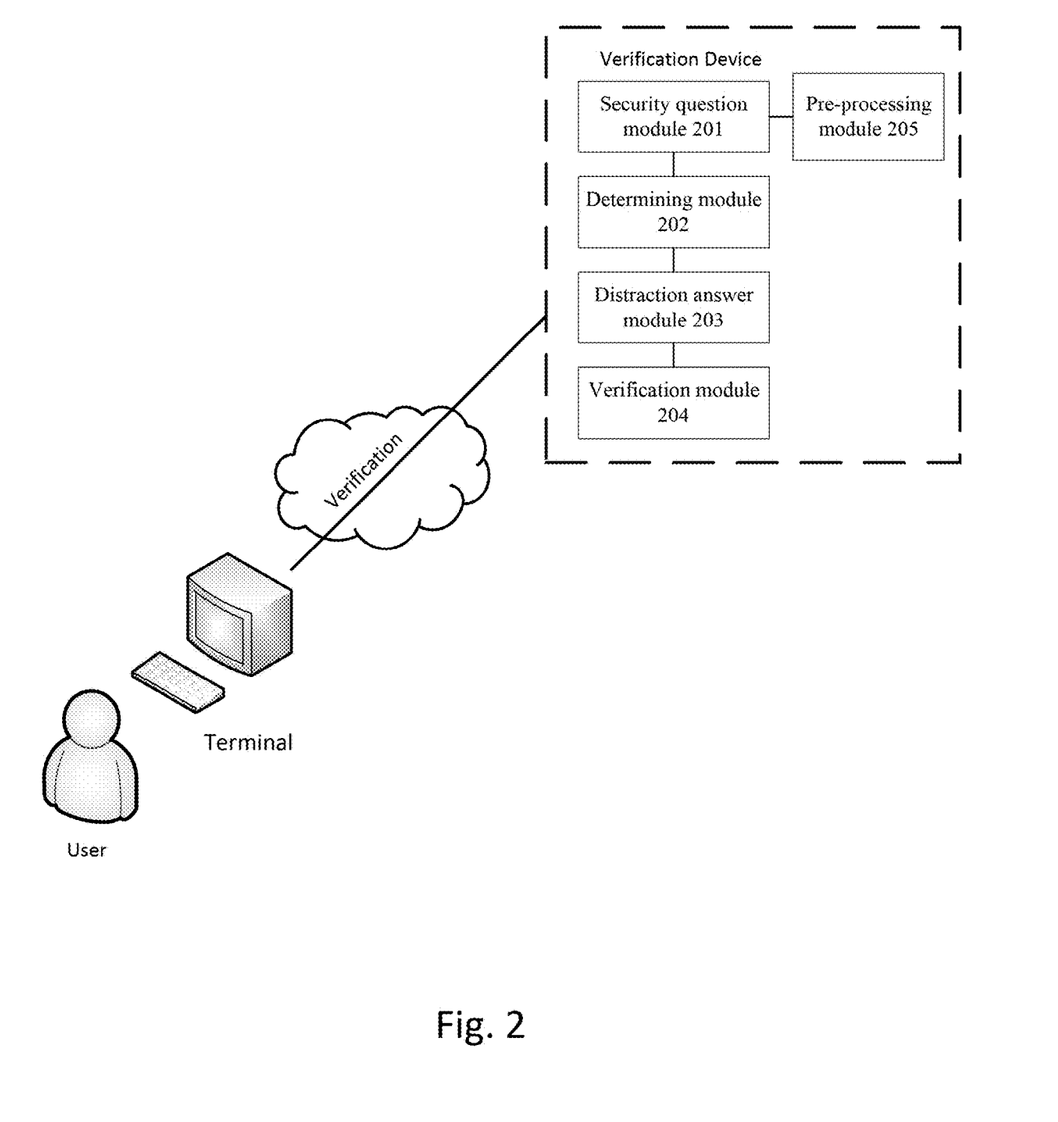
FIG. 2 is a schematic structural diagram of a verification device according to some embodiments of the specification.

As shown in FIG. 2, the verification device is provided at the server side of a business provider, and the device comprises:

a security question module 201 configured to generate a security question for verifying a target user and determine an answer for the target user to match the security question;

a determining module 202 configured to determine a category identification of the answer for the target user, and determine users' data corresponding to the category identification of the answer for the target user;

a distraction answer module 203 configured to search, in the determined users' data, for one or more pieces of the users' data related to the answer for the target user to serve as one or more distraction answers; and a verification module 204 configured to verify the target user according to the security question, the answer for the target user, and the one or more distraction answers.

The device further comprises: a pre-processing module 205 configured to acquire data from a plurality of users, the acquired data forming the users' data; determine a category identification of each piece of the users' data; categorize the users' data into categories according to the category identification of each piece of the users' data, each category corresponding to a category identification; and generate one or more answer libraries each corresponding to a category identification for each category of the users' data.

In some embodiments, the user's data comprises: at least one of operation data generated based on operations of the users and the users' personal data; and each category identification comprises: at least one personal data attribute identification and/or at least one operation data attribute identification.

When the category identification of the answer for the target user includes an operation data attribute identification, the distraction answer module 203 determines an answer library corresponding to the operation data attribute identification, searches in the determined answer library for users' data corresponding to a personal data attribute identification of the target user, and searches, in the users' data corresponding to the personal data attribute identification of the target user, for the one or more pieces of the users' data related to the answer for the target user according to semantics and/or characters of the answer for the target user to serve as the one or more distraction answers; or when the category identification of the answer for the target user includes a personal data attribute identification, determines an answer library corresponding to the personal data attribute identification, and searches in the determined answer library for the one or more pieces of the users' data related to the answer for the target user according to semantics and/or characters of the answer for the target user to serve as the one or more distraction answers.

For example, the distraction answer module 203 determines a similarity between the answer for the target user and each piece of the users' data according to the semantics and/or characters of the answer for the target user, and searches for one or more pieces of users' data related to the answer for the target user according to the similarity.

For another example, if the number of the pieces of the users' data found according to the similarity is greater than a threshold, the distraction answer module 203 selects, according to the similarity in a descending order, the set number of pieces of users' data as distraction answers from the found pieces of users' data.

In addition, the pre-processing module 205 acquires changed users' data from users when the users' data changes; alternatively, acquires users' data from users according to a set period, and updates the answer libraries with the acquired user data.

The embodiments are described with reference to the flow charts and/or block diagrams of the method, device (system), and computer program product according to the present invention. It should be understood that every process and/or block of the flow charts and/or block diagrams and a combination of processes and/or blocks of the flow charts and/or block diagrams can be implemented by computer program instructions. These computer program instructions can be provided to a general-purpose computer, a dedicated computer, an embedded processor, or a processor of another programmable data processing device, thereby producing a machine and causing these instructions to, when executed by the computer or the processor of another programmable data processing device, produce an apparatus for implementing functions specified in one or more processes in the flow charts and/or one or more blocks in the block diagrams.

These computer program instructions can also be stored in a computer readable storage medium capable of guiding a computer or other programmable data processing devices to work in a particular manner, so that the instructions stored in the computer readable storage medium produce a manufactured article that includes an instruction device for implementing functions specified in one or more processes in the flow charts and/or one or more blocks in the block diagrams.

These computer program instructions can also be loaded onto a computer or other programmable data processing devices, causing a series of operating steps to be executed on the computer or other programmable data processing devices to produce a process of computer implementation, thereby enabling instructions executed on the computer or other programmable data processing devices to implement functions specified in one or more processes in the flow charts and/or one or more blocks in the block diagrams.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including," "comprising" or any other variants thereof intend to encompass a non-exclusive inclusion, so that a process, method, product or device comprising a series of elements not only comprises these elements, but also comprises other elements that are not specifically listed, or further comprises elements that are inherent to the process, method, product or device. When there is no further restriction, elements defined by the statement "comprising one . . . " do not exclude that a process, method, product or device comprising the above elements further comprises additional identical elements.

A person skilled in the art should understand that the embodiments of the specification may be provided as a method, a system, or a computer program product. Therefore, the specification may be implemented as a complete hardware embodiment, a complete software embodiment, or an embodiment combining software and hardware. Moreover, the specification may be in the form of a computer program product implemented on one or more computer usable storage media (including, but not limited to, a magnetic disk memory, CD-ROM, an optical memory, and the like) comprising computer usable program codes therein.

Only embodiments of the specification are described above, which are not used to limit the specification. To a person skilled in the art, the specification may have various modifications and variations. Any modification, equivalent substitution or improvement made within the spirit and principle of the specification shall be encompassed by the claims of the specification.

What is claimed is:

1. A computer-implemented verification method, comprising:
   generating, by a server, a security question for verifying a target user;
   determining, by the server, an answer for the target user to match the security question;
   generating, by the server, one or more distraction answers by:
      determining a category identification of the answer for the target user, wherein the category identification includes an operation data attribute identification, and the operation data attribute identification includes an operation type identification that is associated with a transfer operation performed by the target user or a payment operation performed by the target user,
      determining an answer library corresponding to the operation data attribute identification,
      searching in the determined answer library for users' data corresponding to a personal data attribute identification of the target user, wherein the personal data attribute identification of the target user includes the target user's natural attributes, and
      searching, in the users' data, for one or more pieces of the users' data related to the answer for the target user to serve as the one or more distraction answers, wherein the one or more distraction answers and the answer for the target user have the same category identification, format, and semantics;
   sending, by the server, the security question, the answer for the target user, and the one or more distraction answers over a communication network to a terminal used by the user;
   receiving, by the server from the terminal over the communication network, a selection by the target user of the answer for the target user or one of the one or more distraction answers; and
   verifying, by the server, the target user according to the received selection.

2. The method according to claim 1, wherein the method further comprises the following steps for obtaining the users' data:
   acquiring, by the server, data from a plurality of users, the acquired data forming the users' data;
   determining, by the server, a category identification of each piece of the users' data;
   categorizing, by the server, the users' data into categories according to the category identification of each piece of the users' data, each category corresponding to a category identification; and
   generating, by the server, one or more answer libraries each corresponding to a category identification for each category of the users' data.

3. The method according to claim 2, wherein the users' data comprises: at least one of operation data generated based on operations of the users and the users' personal data.

4. The method according to claim 2, wherein each category identification comprises: at least one personal data attribute identification.

5. The method according to claim 4, wherein searching, in the users' data, for one or more pieces of the users' data related to the answer for the target user to serve as one or more distraction answers comprises:
   searching, by the server, in the users' data corresponding to the personal data attribute identification of the target user, for the one or more pieces of the users' data related to the answer for the target user according to semantics or characters of the answer for the target user to serve as the one or more distraction answers.

6. The method according to claim 5, wherein searching for the one or more pieces of the users' data related to the answer for the target user according to semantics or characters of the answer for the target user comprises:
   determining, by the server, according to the semantics or characters of the answer for the target user, a similarity between the answer for the target user and each piece of the users' data corresponding to the personal data attribute identification of the target user; and
   searching, by the server, for the one or more pieces of the users' data related to the answer for the target user according to the similarity.

7. The method according to claim 6, wherein searching for the one or more pieces of the users' data related to the answer for the target user according to semantics or characters of the answer for the target user comprises:
   if the number of the pieces of the users' data found according to the similarity is greater than a threshold, selecting, by the server, according to the similarity, a number of pieces of the users' data as the distraction answers from the pieces of the users' data.

8. The method according to claim 2, wherein acquiring data from a plurality of users comprises:
   when the data from the plurality of users changes, acquiring, by the server, changed data; and
   wherein the method further comprises:
   updating, by the server, the answer libraries with the changed data.

9. The method according to claim 2, wherein acquiring data from a plurality of users comprises:
   acquiring, by the server, data from the plurality of users according to a set period; and
   wherein the method further comprises:
   updating, by the server, the answer libraries with the data acquired from the plurality of users according to the set period.

10. A verification device, comprising: one or more processors and one or more non-transitory computer-readable memories coupled to the one or more processors and configured with instructions executable by the one or more processors to cause the device to perform operations comprising:
    generating a security question for verifying a target user;
    determining an answer for the target user to match the security question;
    generating one or more distraction answers by:
       determining a category identification of the answer for the target user, wherein the category identification includes an operation data attribute identification, and the operation data attribute identification includes an operation type identification that is associated with a transfer operation performed by the target user or a payment operation performed by the target user,
       determining an answer library corresponding to the operation data attribute identification;
       searching in the determined answer library for users' data corresponding to a personal data attribute identification of the target user, wherein the personal data attribute identification of the target user includes the target user's natural attributes, and
       searching, in the users' data, for one or more pieces of the users' data related to the answer for the target user to serve as one or more distraction answers, wherein the one or more distraction answers and the answer for the target user have the same category identification, format, and semantics;
    sending the security question, the answer for the target user, and the one or more distraction answers over a communication network to a terminal used by the user;
    receiving from the terminal over the communication network, a selection by the target user of the answer for the target user or one of the one or more distraction answers; and
    verifying the target user according to the received selection.

11. The device according to claim 10, wherein the operations further comprise the following steps for obtaining the users' data:
    acquiring data from a plurality of users, the acquired data forming the users' data;
    determining a category identification of each piece of the users' data;
    categorizing the users' data into categories according to the category identification of each piece of the users' data, each category corresponding to a category identification; and
    generating one or more answer libraries each corresponding to a category identification for each category of the users' data.

12. The device according to claim 11, wherein the users' data comprises: at least one of operation data generated based on operations of the users and the users' personal data.

13. The device according to claim 11, wherein each category identification comprises: at least one personal data attribute identification.

14. The device according to claim 13, wherein searching, in the users' data, for one or more pieces of the users' data related to the answer for the target user to serve as one or more distraction answers comprises:
    searching, in the users' data corresponding to the personal data attribute identification of the target user, for the one or more pieces of the users' data related to the answer for the target user according to semantics or characters of the answer for the target user to serve as the one or more distraction answers.

15. The device according to claim 14, wherein searching for the one or more pieces of the users' data related to the answer for the target user according to semantics or characters of the answer for the target user comprises:
    determining, according to the semantics or characters of the answer for the target user, a similarity between the answer for the target user and each piece of the users' data corresponding to the personal data attribute identification of the target user; and
    searching for the one or more pieces of the users' data related to the answer for the target user according to the similarity.

16. The device according to claim 15, wherein searching for the one or more pieces of the users' data related to the answer for the target user according to semantics or characters of the answer for the target user comprises:
    if the number of the pieces of the users' data found according to the similarity is greater than a threshold, selecting, according to the similarity, a number of pieces of the users' data as the distraction answers from the pieces of the users' data.

17. The device according to claim 11, wherein acquiring data from a plurality of users comprises:
when the data from the plurality of users changes, acquiring changed data; and
wherein the method further comprises:
updating the answer libraries with the changed data.

18. A non-transitory computer-readable storage medium storing instructions executable by one or more processors in a server to cause the one or more processors to perform operations comprising:
generating, by the server, a security question for verifying a target user;
determining, by the server, an answer for the target user to match the security question;
generating, by the server, one or more distraction answers by:
determining a category identification of the answer for the target user, wherein the category identification includes an operation data attribute identification, and the operation data attribute identification includes an operation type identification that is associated with a transfer operation performed by the target user or a payment operation performed by the target user,
determining an answer library corresponding to the operation data attribute identification;
searching in the determined answer library for users' data corresponding to a personal data attribute identification of the target user, wherein the personal data attribute identification of the target user includes the target user's natural attributes, and
searching, in the users' data, for one or more pieces of the users' data related to the answer for the target user to serve as one or more distraction answers, wherein the one or more distraction answers and the answer for the target user have the same category identification, format, and semantics;
sending, by the server, the security question, the answer for the target user, and the one or more distraction answers over a communication network to a terminal used by the user;
receiving, by the server from the terminal over the communication network, a selection by the target user of the answer for the target user or one of the one or more distraction answers; and
verifying, by the server, the target user according to the received selection.

* * * * *